Figure 1:
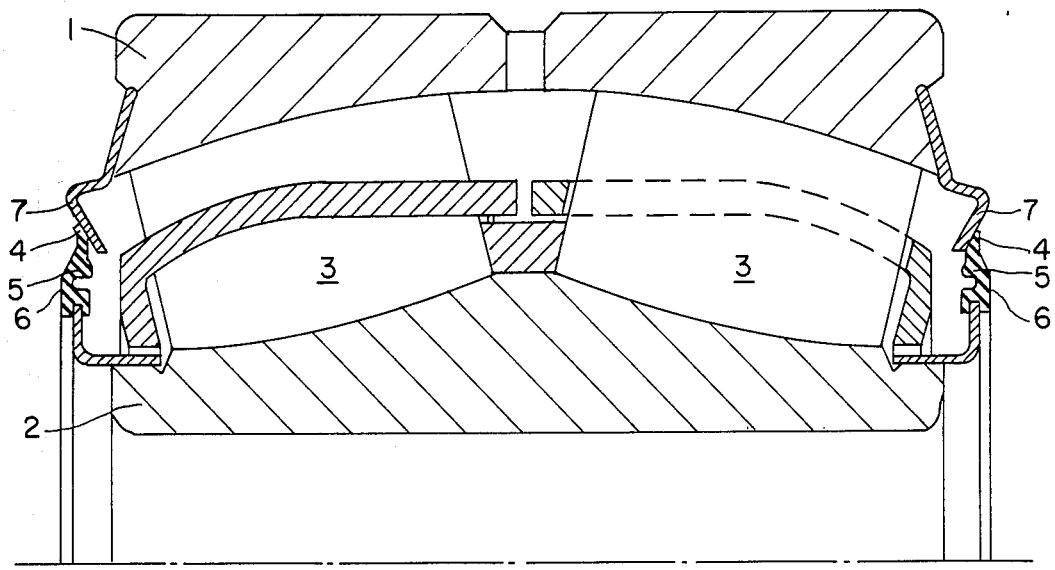

United States Patent [19]

Wittmeyer et al.

[11] Patent Number: 4,790,543
[45] Date of Patent: Dec. 13, 1988

[54] SEALING DEVICE GOVERNED BY CENTRIFUGAL FORCE

[75] Inventors: Henning Wittmeyer, Gothenburg; Magnus Kellström, Partille; Staffan Jarskär, Molndal; Matts Floderus, Gothenburg, all of Sweden

[73] Assignee: Aktiebolaget SKF, Sweden

[21] Appl. No.: 119,152

[22] Filed: Nov. 10, 1987

[30] Foreign Application Priority Data

Nov. 12, 1986 [SE] Sweden ................................ 8604831

[51] Int. Cl.⁴ .............................................. F16J 15/36
[52] U.S. Cl. .................................... 277/25; 277/38; 277/43; 277/45; 277/95; 384/482
[58] Field of Search .................... 277/25, 37-43, 277/45-49, 95, 173, 177; 384/135, 136, 139-141, 478, 481, 482

[56] References Cited

U.S. PATENT DOCUMENTS

| 2,637,574 | 5/1953 | Diehl | 277/25 |
| 3,606,351 | 9/1971 | Hallerback | 277/25 |
| 3,870,384 | 3/1975 | Ladin | 384/482 |
| 4,260,165 | 4/1981 | Hartelius | 277/95 X |
| 4,513,976 | 4/1985 | Bentley et al. | 277/25 |
| 4,565,378 | 1/1986 | Wehrfritz et al. | 277/25 X |
| 4,592,666 | 6/1986 | Jornhagen | 384/482 X |

FOREIGN PATENT DOCUMENTS 2554840 6/1976 Fed. Rep. of Germany ........ 277/95

Primary Examiner—Robert S. Ward
Attorney, Agent, or Firm—Eugene E. Renz, Jr.

[57] ABSTRACT

A sealing device for a slot between two elements, which are rotatable relative to each other, e.g. an outer and an inner race ring in a rolling bearing, incorporates a flexible sealing portion having a lip, which contacts a sealing surface surrounding the lip. The sealing portion is rotatable, and the centrifugal force acts upon it thus that it tends to leave the surface at increasing rotational speed. In order positively to avoid that the lip is urged so hard against the surface at high rotational speeds, that an unallowable temperature increase occurs, the sealing portion and the surface have profiles of such shape, that the lip is displaced in a direction which has a component directed radially outwards relative to the rotational axis, when the sealing portion with the lip is bent by the centrifugal force.

3 Claims, 1 Drawing Sheet

SEALING DEVICE GOVERNED BY CENTRIFUGAL FORCE

Such a device is earlier known, e.g., by Swedish published patent application No. 321,833. It incorporates a sealing lip engaging, e.g., a surrounding cylindrical surface (3c in FIG. 3) and which is so located on a sealing portion acted upon by the centrifugal force that its contact pressure against the cylindrical surface tends to be reduced when the centrifugal force bends the sealing portion which is elastically connected to the rotating shaft.

A drawback with an arrangement of this type is that the centrifugal force acts upon the sealing lip itself whereby this tends to be pushed radially outwards and thereby be pressed against the cylindrical surface situated outside the lip. It, therefore, may happen that the lip is pushed harder against this surface at increased rotational speed although the earlier mentioned bending of the sealing portion acts in the opposite direction as this bending tends to displace the sealing lip in towards the rotational center and thus, is counteracted by the centrifugal force. The temperature in the lip increases with increased lip pressure. The temperature thereby may become so high that the sealing material or any lubricant may be destroyed. This problem is not at hand if the lip engages an entirely plane and only radially extending surface, such as e.g., the surface 3b in FIG. 4 of the mentioned publication. The centrifugal force, which is directed only radially, in such an arrangement does not press the sealing lip against the said surface, but the variation of the contact pressure concurrently with the rotational speed is completely dependent on the bending of the said sealing portion, whereby uncontrolled temperature increase may be avoided.

It, however, often is desirable that the surface against which the sealing lip engages is such that the sealing lip is surrounded by the surface, whereby the engagement occurs with a force, which has a component directed radially outwards relative to the roational axis. In such an arrangement the sealing lip is protected by the surrounding surface whereby it is not so easily damaged by external influence. The purpose of the present invention is to provide such a sealing device, in which is positively avoided that the sealing lip by centrifugal force is pressed so hard against the surrounding surface that an unpermissibly high temperature will arise in the lip. This is according to the invention achieved in that the device is made with the features defined in claim 1.

Figure 2:
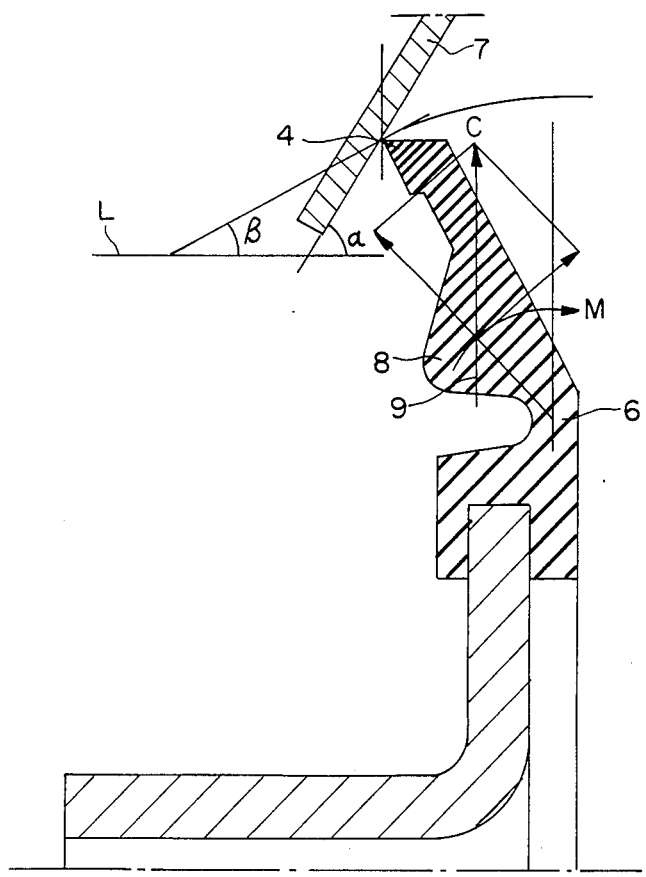

The invention hereinafter will be further described with reference to the accompanying drawings, in which:

FIG. 1 shows a section through a part of a rolling bearing provided with a sealing device according to an embodiment of the invention; and FIG. 2 shows a detail of the sealing device in bigger scale.

The device shown in FIG. 1 incorporates two elements, which are rotatable relative to each other, and are in the form of an outer race ring 1 and an inner race ring 2 of a rolling bearing. A number of rolling bodies 3 are arranged in a space between the outer and inner rings, and this space is sealed off by a sealing device applied to one side surface of the bearing. The sealing device incorporates an annular elastic sealing lip 4 arranged on a sealing portion 5, which, in turn, is connected to the inner race ring 2 of the bearing, which race ring is here supposed to be rotating. The connection between the portion 5 and the inner race ring 2 is provided via a flexible sealing portion 6, here shown in the form of a thin and therefor, easily deformable section of the sealing part 5, which is manufactured from an elastic material integral with the sealing lip 4.

The lip 4 contacts an opposed annular sealing surface 7, which in the embodiment shown is constituted by a bent sheet metal ring attached to the side surface of the bearing outer race ring 1. The sheet metal ring is bent thus that the surface 7 surrounds the sealing lip 4, whereby the lip engages the surface with a force, which has a component directed radially outwards relative to the rotational axis. The contact force arises as a result of that the lip 4, and to a certain extent also other parts of the sealing portion 5, is deformed elastically when the sealing portion 5 is pushed into its position in the inner race ring 2 of the bearing and the lip 7 thereby presses against the surface 7. Due to the elasticity of the lip 4 it is possible to allow the outer and inner rings of the bearing to be skewed somewhat relative to each other without the contact between the lip 4 and the surface 7 thereby ceasing. The seal thus can be used for a self-aligning bearing.

FIG. 2 shows the sealing portion 5 in bigger scale in a position where at assembly it has been pushed in so far against the surface 7 that the lip 4 only just contacts this surface. The sealing portion 5 is provided with an annular projecting portion 8 thus that the center of gravity of the sealing portion is situated in a plane 9 axially displaced relative to the flexible sealing portion 6. A torsional momment created by the centrifugal force at the rotation of the sealing portion thereby tends to bend the sealing portion with the lip 4 away from the lip contact with the opposed sealing surface 7. In accordance with the invention, the sealing portion 5 and the opposed sealing surface 7 are so arranged that they, in a sectional plane which incorporates the rotational axis, has profiles of such shapes and such mutual positions that, when the sealing portion 5 with the lip 4 is bent by the centrifugal force C during rotational motion, the lip 4 is displaced in a direction 4, which has a component directed radially outwards relative to the rotational axis. It is thereby avoided that the bending will have a directional component opposed to the direction of the centrifugal force. This is obtained if the plane of the lip 4 and the center of gravity 9 are situated on the same side of the flexible sealing portion 6.

In order to allow the lip to move in a direction away from its contact with the sealing surface 7, when the sealing portion 5 is bent by the centrifugal force at rotation in the embodiment shown, the surface 7 or a tangent thereto in the contact with the sealing lip shall form an angle $\alpha$ with the rotational axis of the rotatable element or with a straight line L in parallel thereto, which angle is bigger than the angle $\beta$ to said straight line formed by the tangent in said contact with the arc formed by the lip, when displaced due to the bending of the sealing portion 5.

The surface 7 is tapering in the embodiment shown, but it can possibly also have a curved profile. The lip 4 is given the shape which in each application gives a desired contact against the surface 7.

What is claimed is:

1. A device for sealing off an annular slot between an outer race ring (1) and an inner race ring (2) of a bearing assembly which are rotatable relative to each other, whereby an annular elastic sealing lip (4) is arranged on a sealing portion (5), which is connected to the inner race (2) via a flexible sealing portion (6), whereby the lip, when no rotation is at hand, contacts an opposed annular sealing surface (7) mounted on said outer race ring (1) of said bearing with a force, which has a component directed radially outwards relative to the rotational axis, and the center of gravity (9) of said sealing portion is axially displaced relative to the flexible sealing portion (7) thus that a torsional moment created by the centrifugal force tends to bend the sealing portion with the lip away from its contact with the opposed sealing surface, characterized therein that said sealing portion (5) and the opposed sealing surface (7) in a sectional plane incorporating the rotational axis of the rotatable member have profiles of such shapes and such mutual positions, that, when the sealing portion with the lip is bent by the centrifugal force, the lip is displaced in a direction, which has a component directed radially outwards relative to the rotational axis.

2. A device as claimed in claim 1, characterized therein that said opposed sealing surface (7) is tapering.

3. A device as claimed in claim 1, characterized therein that a line parallel to the annular sealing surface and parallel to the tangent at the point of contact with the surface and the sealing lip forms an angle with the rotational axis formed by the tangent in said contact to the arc, described by the lip (4) when displaced by the bending of the sealing portion (5).

* * * * *